United States Patent [19]

Harada et al.

[11] Patent Number: 5,040,495
[45] Date of Patent: Aug. 20, 1991

[54] SUCTION APPARATUS FOR ENGINE

[75] Inventors: Masaki Harada; Koichi Nagamoto, both of Hiroshima, Japan

[73] Assignee: Mazda Motor Corporation, Hiroshima, Japan

[21] Appl. No.: 458,289

[22] Filed: Dec. 28, 1989

[30] Foreign Application Priority Data

Dec. 28, 1988 [JP] Japan .................. 63-332568

[51] Int. Cl.$^5$ ............................. F02M 35/10
[52] U.S. Cl. ............................. 123/52 MB
[58] Field of Search .......... 123/52 MB, 52 M, 52 MF

[56] References Cited

U.S. PATENT DOCUMENTS

| 4,254,746 | 3/1981 | Chiba et al. | |
| 4,510,896 | 4/1985 | Rutschmann | 123/52 MB |
| 4,513,699 | 4/1985 | Cser | 123/52 M |
| 4,574,748 | 3/1986 | Inoue et al. | 123/52 MB |
| 4,630,575 | 12/1986 | Hatamura et al. | 123/52 MB |
| 4,727,829 | 3/1988 | Kondo et al. | 123/52 MB |
| 4,760,819 | 8/1988 | Vorum | 123/52 MB |
| 4,829,941 | 5/1989 | Hitomi et al. | 123/52 MV |
| 4,838,215 | 6/1989 | Yasuda et al. | 123/52 MB |
| 4,846,117 | 7/1989 | Hitomi et al. | 123/52 MV |
| 4,858,569 | 8/1989 | Cser et al. | 123/52 MB |
| 4,858,570 | 8/1989 | Matsumoto et al. | 123/52 ML |

FOREIGN PATENT DOCUMENTS

| 0192457 | 8/1986 | European Pat. Off. | |
| 1227456 | 8/1960 | France. | |
| 1163444 | 9/1960 | France. | |
| 2393163 | 5/1978 | France. | |
| 2536792 | 11/1982 | France. | |
| 0051909 | 4/1980 | Japan | 123/52 MB |
| 61-190158 | 8/1986 | Japan. | |

OTHER PUBLICATIONS

European Search Report citing 6 prior art references (enclosed), completed 03/22/90 in Berlin by Examiner B. Novelli.

Primary Examiner—David A. Okonsky

[57] ABSTRACT

A suction apparatus for an engine is provided with an intake path which has an opening portion at one end, and the other end of which is connected to an intake pulsation generation source. A resonator is connected to a downstream portion of said intake path through a connecting pipe, for eliminating a $(0.5+n)$th-order (where n is an integer equal to or larger than 0) resonant wave in the intake path which is induced by a compression wave generated from said intake pulsation generation source toward the upstream side.

17 Claims, 8 Drawing Sheets

SUCTION APPARATUS FOR ENGINE

BACKGROUND OF THE INVENTION

The present invention relates to a suction apparatus for introducing outer air into a cylinder chamber of an engine through an intake path and, more particularly, to a suction apparatus for an engine, which comprises a resonator for eliminating a resonance wave induced in an intake path by an intake pulsation, and can eliminate intake noise and can improve intake air filling efficiency.

In an engine, a variation in pressure, i.e., an intake pulsation periodically occurs near an intake port by an intake negative pressure generated when an intake valve is opened. For example, a four-cylinder engine which comprises a surge tank which collects independent intake paths of the cylinders, and also comprises a common intake path for introducing intake air into the surge tank is known. In the four-cylinder engine, the surge tank is an intake pulsation generation source. A compression wave of intake air is generated by the intake pulsation. The compression wave is transmitted at a sonic speed toward the upstream side in the common intake path, is reflected at an upstream opening portion (to be simply referred to as an opening portion hereinafter) of the common intake path, and is then transmitted to the surge tank toward the downstream side in the common intake path. In the following description, the compression wave which propagates toward the upstream side in the intake path will be referred to as an incident wave hereinafter, and the compression wave which propagates toward the downstream side will be referred to as a reflection wave hereinafter.

More specifically, the opening portion is defined as a transition region from a high-impedance region in the common intake path to a zero-impedance region in the air. As a result, the opening portion serves as a reflection surface of the incident wave. At the reflection surface, the impedance changes from high to low along the incident direction of the compression wave. Therefore, the incident and reflection waves have opposite compression states (i.e., have a 180° phase difference). The reflection wave has the same wavelength and amplitude as those of the incident wave, and has an opposite propagation direction. As a result, as is well known as synthesis of two waves, the incident and reflection waves interfere with each other, thus forming a standing wave having the same wavelength as that of the incident/reflection wave in the common intake path.

When the relationship given by the following equation is established between a path length L of the common intake path and a wavelength $\lambda$ of the standing wave:

$$L = (2n+1)\lambda/4$$

intake air in the common intake path resonates to have the surge tank (intake pulsation generation source) as a loop and the opening portion as a node with respect to a sound pressure, and a large, i.e., $(0.5+n)$th-order standing wave is formed. This standing wave will be referred to as a resonant wave hereinafter. Upon generation of the resonant wave, large noise is undesirably generated from the opening portion.

When the relationship given by the following equation is established between the path length L and the wavelength $\lambda$:

$$L = 2n\lambda/4$$

intake air in the common intake path resonates to have the surge tank and the opening portion as nodes with respect to a sound pressure, and a large, i.e., nth-order standing wave is formed. Upon generation of this standing wave, large noise is generated from the opening portion.

In order to eliminate the intake noise, as disclosed in, e.g., Japanese Patent Laid-Open (Kokai) Nos. 54-9316 and 61-190158, suction apparatuses are proposed. In these apparatuses, a side-branch type or Helmholtz type resonant silencer is arranged at a position near the opening portion and where the loop of a sound pressure vibration of the resonant wave is formed (normally, at the upstream side of an air cleaner), thereby controlling the sound pressure vibration of the resonant wave induced in the common intake path and eliminating the intake noise.

In the $(0.5+n)$th-order resonant wave generated in the common intake path, the loop of the sound pressure is formed at the downstream end portion (the opening portion to the surge tank). As a result, the intake pressure in the surge tank vibrates with a large amplitude upon vibration of the sound pressure (intake pressure). The vibration of the intake pressure becomes a minimum pressure when a ¾ period elapses from when the compression wave generated at the intake pulsation generation source has a minimum pressure (at substantially the same time with an opening timing of the intake valve).

More specifically, in the four-cylinder, four-cycle engine, the period of the compression wave corresponds to a crank angle of 180°. For this reason, when the crank angle after the intake valve is opened reaches 135° (= 180 × ¾) i.e., at the end of an intake stroke, the intake pressure in the surge tank becomes minimum. In general, since the intake path length between each cylinder and the surge tank is relatively short, a change in pressure in the surge tank is transmitted to each cylinder without a delay time. For this reason, in an engine rotational speed region corresponding to the wavelength $\lambda$ at which the resonant wave is generated in the common intake path, intake air filling efficiency is impaired, and an output torque is decreased.

The nth-order resonant wave does not induce the intake pressure vibration in the surge tank since the downstream end portion (surge tank) of the common intake path becomes the node of the sound pressure.

The conventional resonant silencer which is arranged to eliminate intake noise eliminates the resonant wave in the common intake path. Therefore, a negative pressure induced in the surge tank by the $(0.5+n)$th-order resonant wave can be theoretically eliminated upon operation of the resonant silencer. However, as described above, the resonant silencer is mainly arranged near the upstream opening portion of the common intake path for the purpose of eliminating intake noise. As a result, although the intake noise can be eliminated, since the silencer is spaced apart from the surge tank, the resonant wave elimination effect does not reach the surge tank.

SUMMARY OF THE INVENTION

The present invention has been made in consideration of the conventional problems, and has as its object to provide a suction apparatus for an engine, which can efficiently eliminate intake noise caused by a resonant wave of intake air induced in an intake path, and can effectively prevent a decrease in filling efficiency caused by the resonant wave so as to increase an engine output torque.

In order to achieve the above object, according to one aspect of the suction apparatus for an engine of the present invention, first means for eliminating a (0.5+n)th-order (where n is an integer equal to or larger than 0) resonant wave induced in an intake path by a compression wave which is generated from an intake pulsation generation source toward an upstream side in the intake path at the upstream side of the intake pulsation generation source is arranged at a downstream end portion of the intake path.

Therefore, according to the aspect of the present invention, in an engine rotational speed region where the relationship given by the following equation is established between a wavelength λ of the compression wave generated at the intake pulsation generation source (e.g., a surge tank) and a path length L of the intake path at the upstream side of the intake pulsation generation source:

$$L = (2n+1)\lambda/4 \text{ (where } n = 0, 1, 2, \ldots)$$

the amplitude of the (0.5+n)th-order (where n=0, 1, 2, ...) resonant wave induced in the intake path is greatly eliminated upon interference with the resonant wave induced by the first means. For this reason, the sound pressure level of the resonant wave in the intake path is lowered, and intake noise generated from the upstream opening portion of the intake path can be greatly reduced.

Furthermore, at the intake pulsation generation source (e.g., the surge tank) serving as the loop of a sound pressure vibration, i.e., an intake pressure vibration, the amplitude of the intake pressure vibration is reduced. As a result, no decrease in intake pressure essentially occurs at the end of an intake stroke of each cylinder. More specifically, since the intake pressure is maintained to have a value free from the intake pulsation, intake air filling efficiency can be improved, and the engine output torque can be increased. In this manner, since the first means is used as both the noise eliminating means and torque improving means, an engine can be rendered compact.

The suction apparatus for the engine according to the other aspect of the present invention comprises the above-mentioned first means, and second means for eliminating a resonant wave of an order twice that of the resonant wave eliminated by the first means.

Therefore, according to the other aspect of the present invention, the same effect as that in one aspect of the present invention can be obtained. In general, the first means for eliminating the (0.5+n)th-order resonant wave promotes the vibration of the resonant wave of an order twice that of the (0.5+n)th-order resonant wave, and hence, increases intake noise. However, since the resonant wave of the double order is generated in a high-speed region, no problem is posed in a normally used operating region. Nevertheless according to the other aspect of the present invention, the second means for eliminating the resonant wave of the double order is arranged in addition to the first means for eliminating the (0.5+n)th-order resonant wave. Therefore, generation of intake noise caused by the resonant wave of the double order can be effectively prevented. In this manner, according to the other aspect of the present invention, a special effect of eliminating intake noise over the wide engine rotational speed range can be provided.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

The arrangement of a preferred embodiment of a suction apparatus for an engine according to the present invention will be described hereinafter.

Figure 1:
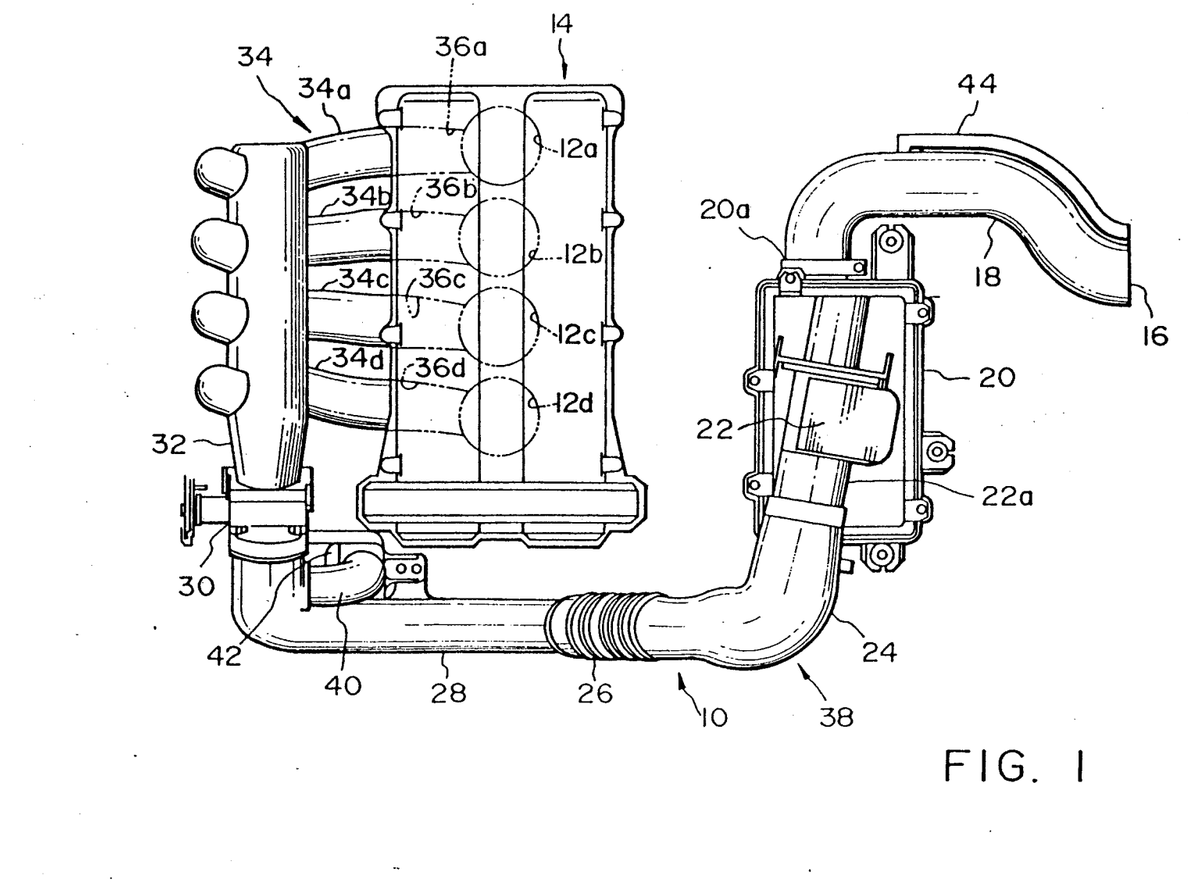
FIG. 1 is a plan view showing an arrangement of a four-cylinder engine comprising a suction apparatus according to an embodiment of the present invention.
Figure 2:
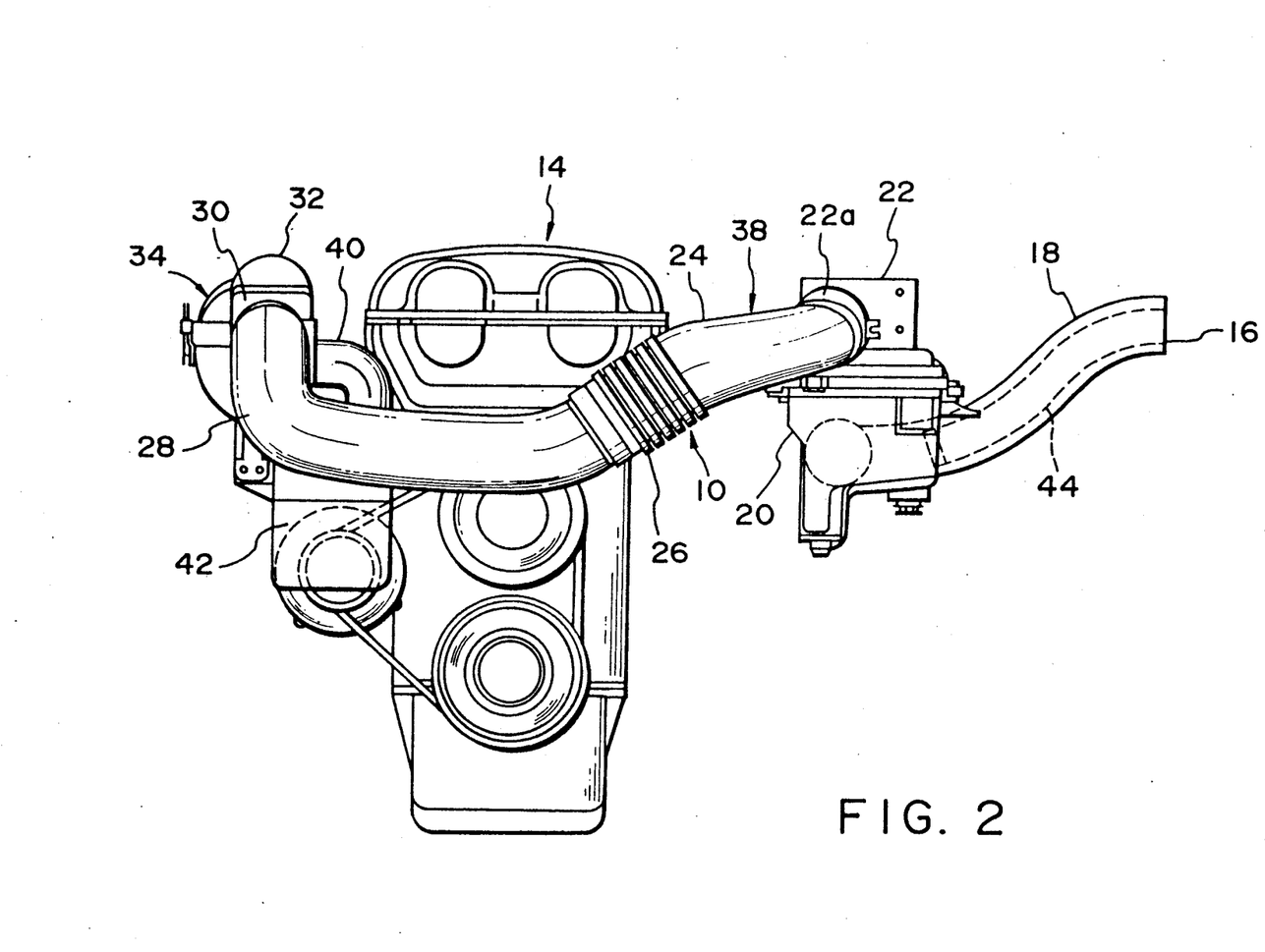
FIG. 2 is a front view of the engine shown in FIG. 1.

As shown in FIGS. 1 and 2, a suction apparatus 10 of this embodiment is arranged to supply intake air to a four-cylinder engine 14 comprising first to fourth cylinders 12a, 12b, 12c, and 12d. In order to introduce, i.e., take outer air into the engine 14 through the suction apparatus 10, a fresh air duct 18 communicating with air at an opening portion 16 defined as the most upstream side with respect to an intake direction is arranged. The downstream end portion of the fresh air duct 18 is connected to an air inlet port 20a formed in the rear side surface (in the front-and-rear direction of the vehicle body) of an air cleaner 20 for removing floating dust in intake air. An air flow meter 22 for detecting an intake air amount is connected to the top surface of the air cleaner 20 to be adjacent thereto.

The upstream end portion of an air intake hose 24 formed of a flexible material, such as rubber, is connected to an air outlet port 22a formed in the front side surface of the air flow meter 22. The downstream end portion of the air intake hose 24 is connected to an intake pipe 28 formed of a hard material, such as a metal or plastic, through a connecting member 26. Furthermore, the downstream end portion of the intake pipe 28 is connected to a throttle body 30 comprising a throttle valve (not shown) which is opened/closed to be interlocked with an accelerator pedal (not shown). A surge tank 32 for stabilizing an intake air flow rate is connected to the downstream side of the throttle body 30.

The surge tank 32 is arranged beside the intake side of the engine 14 (on the left-hand side in FIG. 1), and has an elongated shape extending along a cylinder aligning direction (in this embodiment, the front-and-rear direction of the vehicle body) to have a predetermined volume. The length of the surge tank 32 in the cylinder aligning direction is substantially equal to the total length of the engine 14. The upstream end portion of an intake manifold 34 for supplying intake air to the cylinders 12a to 12d is connected to the side wall of the surge tank 32 on the side opposite to the engine 14 (on the left-hand side in FIG. 1). The intake manifold 34 comprises branch intake pipes 34a, 34b, 34c, and 34d which extend from the surge tank 32, are bent downward to extend below the surge tank 32 while changing the extending direction by 180°, and are respectively connected to intake ports 36a, 36b, 36c, and 36d of the corresponding cylinders 12a, 12b, 12c, and 12d.

In the suction apparatus 10, intake air flows from the opening portion 16 toward the downstream side into the surge tank 32 through the fresh air duct 18, the air cleaner 20, the air flow meter 22, the air intake hose 24, the intake pipe 28, and the throttle body 30 in turn. In the following description, an intake air flow path extending from the opening portion 16 to the surge tank 32 will be referred to as an intake path 38.

As will be described in detail below, an intake pressure in the surge tank 32 is decreased by a negative pressure generated in the corresponding intake ports 36a to 36d every time intake valves (not shown) of the cylinders 12a to 12d are opened. Thus, intake air in the surge tank 32 is pulsated due to a decrease in intake pressure, thus generating a compression wave. Upon interference between an incident wave defined by the compression wave up to the opening portion 16 and a reflection wave of the compression wave by the opening portion 16, a resonant wave is induced in the intake path 38 in a predetermined engine rotational speed region. In order to eliminate the resonant wave, in this embodiment, a Helmholtz resonator 42 as a first means is connected to the intake pipe 28 at an immediately upstream position of the throttle body 30 through a connecting pipe 40. As will be described in detail later, in order to eliminate a resonant wave of an order twice that of the resonant wave eliminated by the resonator 42, a side-branch silencer 44 as a second means is connected to the fresh air duct 18 at the upstream side of the air cleaner 20 at a position where the loop of a sound pressure of the resonant wave of the double order is formed. The arrangements and principles of the resonator 42 and the silencer 44 are known from, e.g., "Low-Noise Engine Design Technical Manual" (The Japan Society of Mechanical Engineers, issued on Nov. 2, 1979) and "Design of Sound Insulating Device" (Kaoru IINO, issued on June 20, 1963), and a detailed description thereof will be omitted here.

The functions of the resonator 42 and the silencer 44 will be described below.

Figure 3:
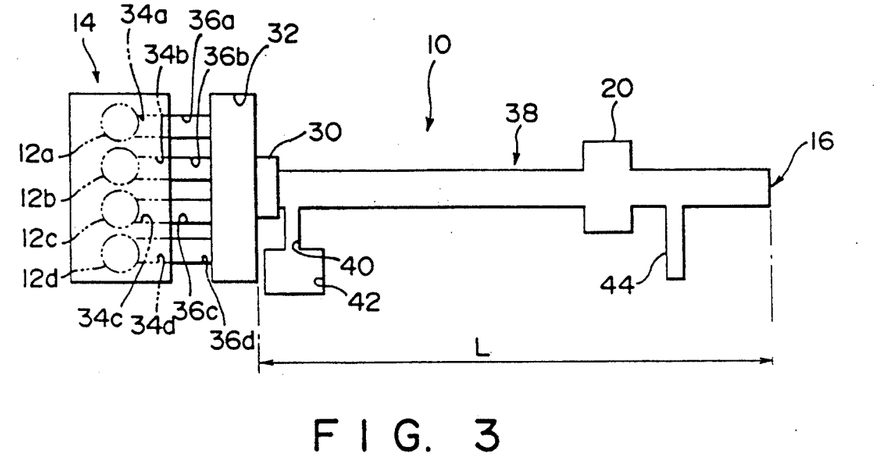
FIG. 3 is a view illustrating a propagation path of a compression wave caused by intake pulsation of the suction apparatus shown in FIG. 1.
Figure 4:
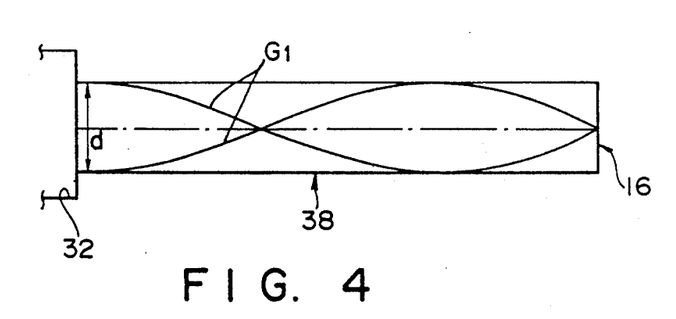
FIG. 4 is a view representing a vibration of a 1.5th-order resonant wave induced in an intake path shown in FIG. 3 as a sound pressure.

FIG. 3 illustrates the suction apparatus 10 shown in FIG. 1. As shown in FIG. 3, a path length L of the intake path 38 is set to be 168 cm on the basis of various factors, such as a tube resistance, the size of an engine room, and the like in this embodiment. The Helmholtz resonator 42, as the characteristic feature of the present invention, is connected to the intake path 38 (i.e., the intake pipe 28) through the connecting pipe 40 at a position 10 cm upstream from the surge tank 32. The resonator 42 is designed to mute a noise component of 160 Hz by 1.5th-order resonance (see FIG. 4) in this embodiment.

The side-branch silencer 44 is connected to the intake path 38 (fresh air duct 18) at a position 29 cm downstream from the opening portion 16 in this embodiment. The side-branch silencer 44 can arbitrarily change a frequency of a noise component to be muted by changing its total length. In this embodiment, the total length of the silencer 44 is set to be 29 cm and is designed to mute a noise component of 320 Hz by 3rd-order resonance (see FIG. 5), which is defined as the order twice the 1.5th order.

Every time the intake valves (not shown) of the cylinders 12a to 12d are opened, a negative pressure is generated in the corresponding intake ports 36a to 36d. This negative pressure is transmitted to the interior of the surge tank 32 within a very short period of time through the intake manifold 34 having a relatively small path length. For this reason, in the surge tank 32, the intake pressure is decreased to induce an intake pulsation every time the intake valves (not shown) of the cylinders 12a to 12d are opened. More specifically, the surge tank 32 serves as an intake pulsation generation source. A compression wave of intake air is generated by the intake pulsation. In the four-cylinder, four-cycle engine of this embodiment, a frequency f of the compression wave is given by:

$$f = 2N \quad (1)$$

where N is the engine rotational speed.

The wavelength of the compression wave is given by:

$$\lambda = v/f \quad (2)$$

where v is the sonic speed.

The compression wave is transmitted as the incident wave toward the upstream side in the intake path 38 at the sonic speed v, and is reflected by the opening portion 16 communicating with external air. In this case, external air serves as a free end of wave reflection. For this reason, the incident wave is reflected without changings its phase, and is converted to a reflection wave. As is well known, the incident and reflection waves have an opposite order of compression (i.e., a 180° phase difference). The reflection wave is transmitted at the sonic speed toward the downstream side in the intake path 38 to the surge tank 32. In the intake path 38, in this case, the incident and reflection waves are present at the same time. Since the incident and reflection waves have substantially the same amplitude and wavelength, they interfere with each other, thereby forming a standing wave having the same wavelength $\lambda$ as that of the incident wave (reflection wave). The standing wave is not normally noticeable. However, when the relationship given by the following equation is established:

$$L=(2n+1)\lambda/4 \qquad (3)$$

where n ... arbitrary integer equal to or larger than 0
L ... path length of intake path
$\lambda$ ... wavelength of standing wave intake air in the intake path 38 considerably resonates to have the downstream end portion (opening portion to the surge tank 32) of the intake path 38 as a loop, and the opening portion 16 as a node with respect to a sound pressure, and large intake noise is externally generated from the opening portion 16. Since the intake path length L is constant, resonant waves are generated at all engine rotational speeds N at which the wavelength $\lambda$ has a value to establish equation (3) for n=0, 1, 2, ....

In this manner, a plurality of resonant waves are generated at different predetermined engine rotational speeds. For example, sound pressure characteristics of a resonant wave when n=1, i.e., when a 1.5th-order resonant wave is generated are represented by a curve $G_1$ in FIG. 4. In the 1.5th-order resonant wave, when no resonator 42 is arranged, since the loop of the sound pressure vibration (intake vibration) is formed at the downstream end portion (opening portion to the surge tank 32) of the intake path 38, an intake pressure vibrates with a large amplitude at the downstream end portion of the intake path 38, as indicated by an arrow d in FIG. 4.

When the sound pressure vibration is considered upon comparison with opening/closing timings of the intake ports 36a to 36d, the sound pressure (intake pressure) of a resonant wave becomes minimum at the end of an intake stroke (near a crank angle of 135° after the intake valve is opened) in a certain cylinder (e.g., the first cylinder 12a). Therefore, since the intake pressure in the surge tank 32 is decreased at this time, the intake air filling efficiency of this cylinder (first cylinder 12a) is decreased, and hence, the output torque of the engine 14 is decreased. At this time, since intake air in the intake path 38 is resonating, large intake noise is generated from the opening portion 16, as a matter of course.

In this embodiment, in order to prevent a decrease in filling efficiency and generation of intake noise, the resonator 42 is arranged. As described above, the resonator 42 is of the Helmholtz type, and is designed to generate a resonant wave (standing wave) in correspondence with the intake pulsation in the surge tank 32 in a path between the connecting pipe 40 and the resonator 42. The characteristics of the resonant wave can be arbitrarily set by adjusting the pipe length and the pipe diameter of the connecting pipe 40 or the volume of the resonator 42. In this embodiment, the connecting pipe 40 and the resonator 42 are set to have characteristics for inducing a resonant wave which generates a maximum sound pressure (positive pressure) in a communicating portion of the connecting pipe 40, with the intake path 38 at a timing at which the 1.5th-order resonant wave (160 Hz) generates a minimum sound pressure at the downstream end portion of the intake path 38. More specifically, the resonator 42 has a volume of 720 cc, and the connecting pipe 40 has a pipe diameter of 35 mm and a length of 95 mm.

The frequency of the 1.5th-order resonant wave is set as follows. More specifically, when n=1.5 is substituted in equation (3) described above, this yields $L=3\lambda/4$. $\lambda$ can be obtained from this equation as follows:

$$\lambda=4L/3 \qquad (4)$$

From equation (2) described above, $\lambda=v/f$, and from equations (2) and (4), $$f=3v/4L \qquad (5)$$

When v=362 m/sec and L=1.68 m are substituted in equation (5), $$f=151 \text{ (Hz)}$$

In this manner, the frequency of the 1.5th-order resonant wave is calculated as 151 Hz. However, the frequency of the 1.5th-order resonant wave is actually set to be 160 Hz in consideration of the shape of the intake path 38 or a change in sonic speed v due to a change in atmospheric pressure or temperature.

As described above, since the communicating portion of the connecting pipe 40 with the intake path 38 is arranged adjacent to the downstream end portion of the intake path 38, the resonant wave of the minimum sound pressure in the intake path 40 and the resonant wave of the maximum sound pressure in the resonator 42 interfere with each other at the end of the intake strokes of the cylinders 12a to 12d, so that an almost average sound pressure, i.e., an intake pressure free from resonance can be obtained. Therefore, a decrease in intake pressure in the surge tank 32, which occurs at the end of the intake stroke when no resonator 42 is arranged, can be prevented. For this reason, the filling efficiency can be improved, and hence, the output torque of the engine 14 can be improved.

Note that when the connecting pipe 40 of the resonator 42 can be connected to the intake path 38 at a position where the loop of another sound pressure is formed, the same effect can be obtained. However, like in this embodiment, when the connecting pipe 40 is connected to the intake path 38 at an immediately upstream position of the throttle body 30, i.e., the surge tank 32, a negative pressure canceling effect of a resonant wave by the resonator 42 can be remarkably enhanced.

Figure 6:
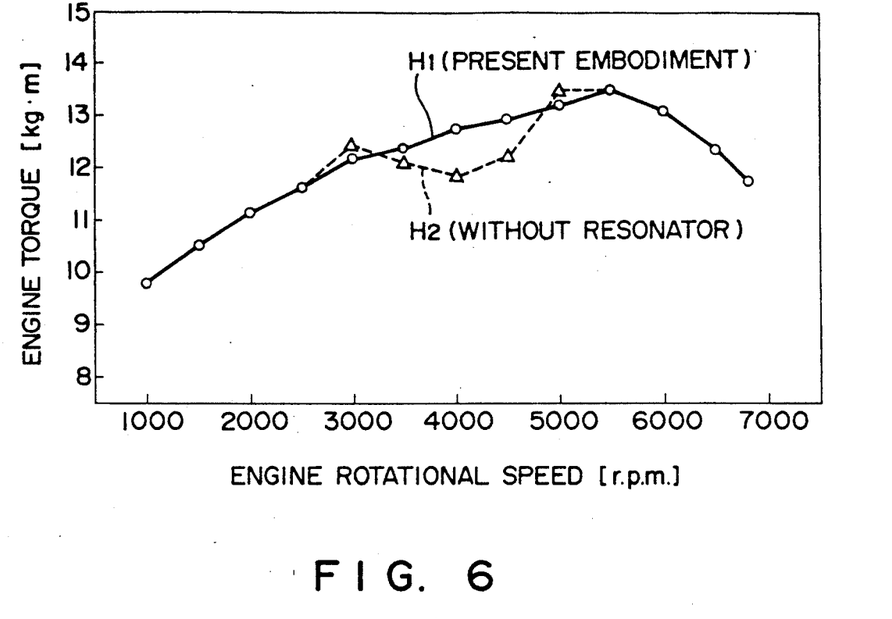
FIG. 6 is a graph for comparing engine torque characteristics as a function of an engine rotational speed for an engine comprising a resonator and a conventional engine having no resonator.

Engine torque characteristics as a function of an engine rotational speed when the resonator 42 is arranged are represented by a polygonal line $H_1$ in FIG. 6. As can be easily understood from FIG. 6, in comparison with engine torque characteristics as a function of an engine rotational speed when no resonator is arranged in an engine of the same type (characteristics represented by a polygonal line $H_2$), an engine torque in a common rotational speed region (3,000 to 4,500 rpm) can be greatly improved.

In this embodiment, the resonator 42 is set to have characteristics for eliminating the 1.5th-order resonant wave. This setup is based on the fact that the 1.5th-order resonant wave is generated in the common rotational speed region of the engine 14. With this setup, an increase in torque and reduction of intake noise in a normal operation state most frequently used can be attained. However, the present invention is not limited to such a setup of the resonator 42 for eliminating the 1.5th-order resonant wave. For example, the resonator 42 may be set to have characteristics for eliminating an arbitrary, i.e., (0.5+n)th-order resonant wave.

When the resonator 42 described above is arranged, a (0.5+n)th-order resonant wave in the intake path 38 can be eliminated, while the amplitude of the resonant wave of an order twice that of the (0.5+n)th-order resonant wave is amplified. In this embodiment, the side-branch silencer 44 for eliminating a resonant wave of an order twice that of the 1.5th-order resonant wave, i.e., a 3rd-order resonant wave (320 Hz) is arranged.

Figure 5:
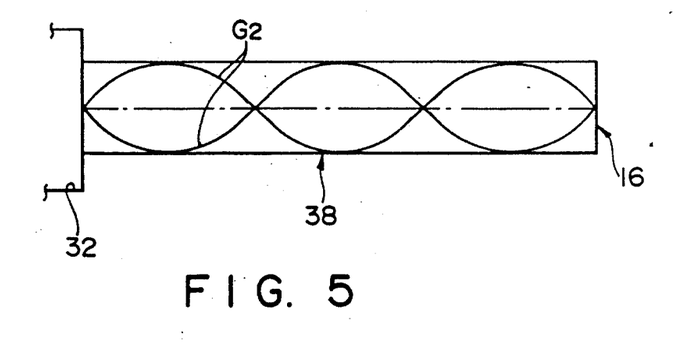
FIG. 5 is a view representing a vibration of a 3th-order resonant wave induced in the intake path shown in FIG. 3 as a sound pressure.

The silencer 44 is connected to the intake path 38 at a position where the loop of a sound pressure of the 3rd-order resonant wave is formed, which is closest to the opening portion 16, as represented by a curve $G_2$ in FIG. 5. This position is a slightly downstream position of the fresh air duct 18 at the upstream side of the air cleaner 20, more specifically, a position 29 cm downstream from the opening portion 16. In this manner, since the silencer 44 is connected at the position where the loop of the sound pressure is formed, which is closest to the opening portion 16, a resonant wave canceling effect of the silencer 44 can most strongly act on the opening portion 16 as compared to a case wherein the silencer is connected to a position where the loop of another sound pressure is formed, thus effectively preventing generation of intake noise from the opening portion 16.

Figure 7:
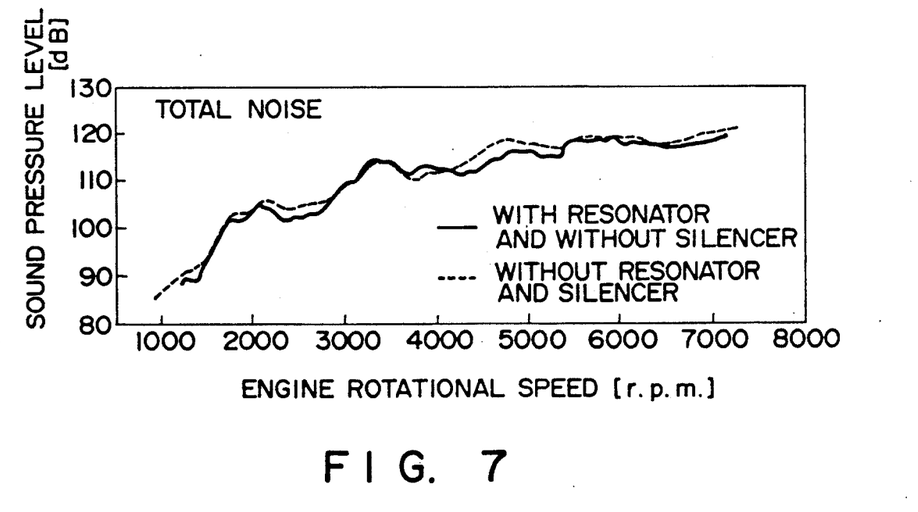
FIG. 7 is a graph for comparing sound pressure level characteristics of intake noise generated from an intake path near an opening portion as a function of an engine rotational speed for an engine comprising a silencer and a conventional engine having no silencer.
Figure 8:
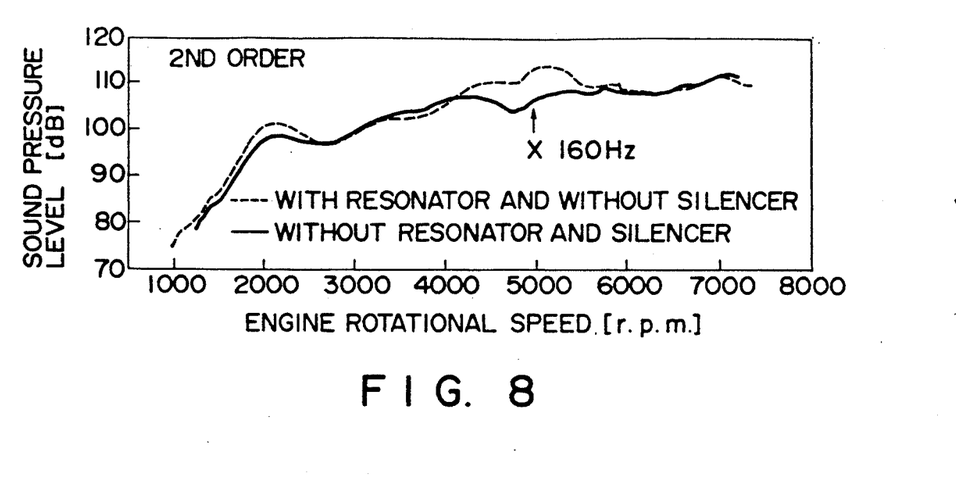
FIGS. 8 to 10 are graphs showing sound pressure level characteristics of noise components having frequencies of 2nd-, 4th-, and 6th-orders with respect to the engine rotational speed in the total intake noise as a function of an engine rotational speed in the same manner as in FIG. 7.
Figure 9:
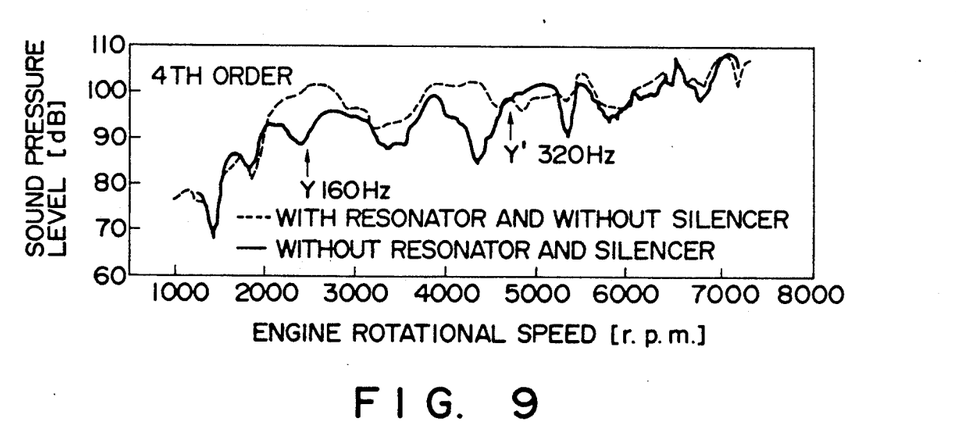
Figure 10:
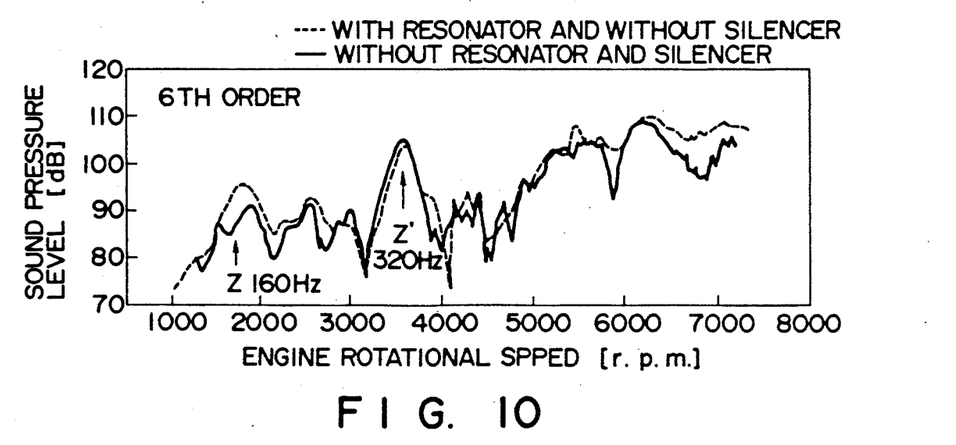

FIGS. 7 to 10 show sound pressure levels of intake noise generated from the fresh air duct 18 near the opening portion 16 in a 1,600-cc four-cylinder engine, which has the resonator 42 but has no silencer 44, as compared to sound pressure levels of intake noise of an engine of the same type, which has neither the resonator 42 nor the silencer 44. FIG. 7 shows the sound pressure level of total noise level, and FIGS. 8, 9, and 10 respectively show sound pressure levels of specific partial noise components having 2nd-, 4th-, and 6th-frequencies as a function of an engine rotational speed.

As can be seen from FIG. 7, for total noise, an engine comprising the resonator according to the present invention can decrease a sound pressure level over almost the entire rotational speed region as compared to an engine comprising no resonator. As can be seen from FIGS. 8, 9, and 10, the sound pressure level of a noise component having a frequency of 160 Hz caused by the 1.5th-order resonance is particularly decreased, as indicated by X, Y, and Z, respectively. In contrast to this, in FIGS. 9 and 10, the sound pressure level of a noise component having a frequency of 320 Hz caused by the 3rd-order resonance is increased by arranging the resonator 42, as indicated by Y' and Z', respectively. As described above, the silencer 44 is arranged to mute the noise component of 320 Hz caused by the 3rd-order resonance.

Figure 11:
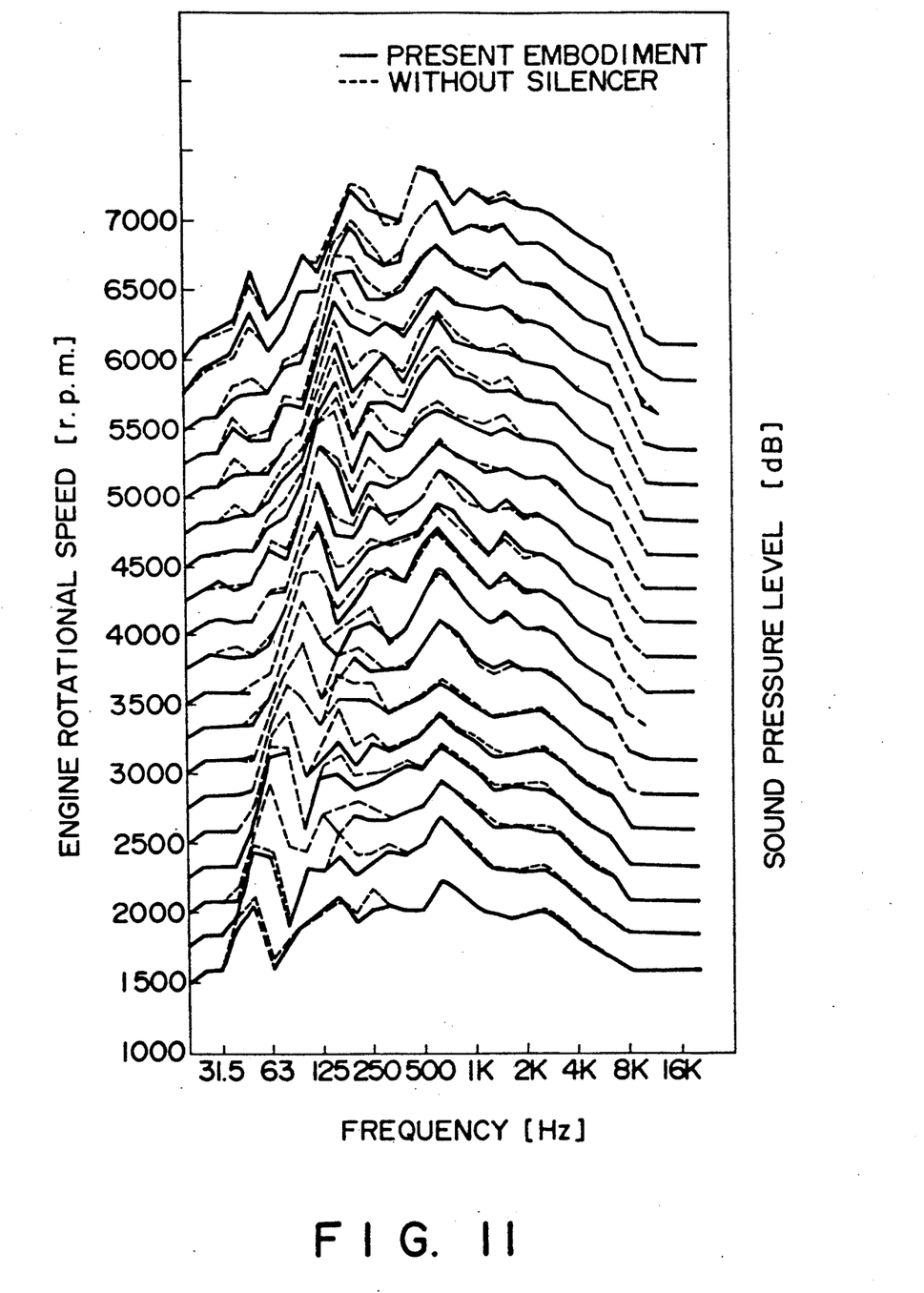
FIG. 11 is a graph showing frequency characteristics of intake noise using an engine rotational speed as a parameter for an engine comprising a silencer and a conventional engine having no silencer.

FIG. 11 shows frequency characteristics of a sound pressure level of intake noise of the engine 14 using an engine rotational speed as a parameter. As can be seen from FIG. 11, an engine comprising the silencer according to the present invention can decrease the sound pressure level over almost the entire frequency range at any engine rotational speed as compared to an engine comprising no silencer.

As described above in detail, according to the present invention, reduction of intake noise and improvement of an engine torque can be effectively attained at the same time.

The present invention is not limited to the arrangement of the above embodiment, and various changes and modifications may be made within the spirit and scope of the invention.

Figure 12:
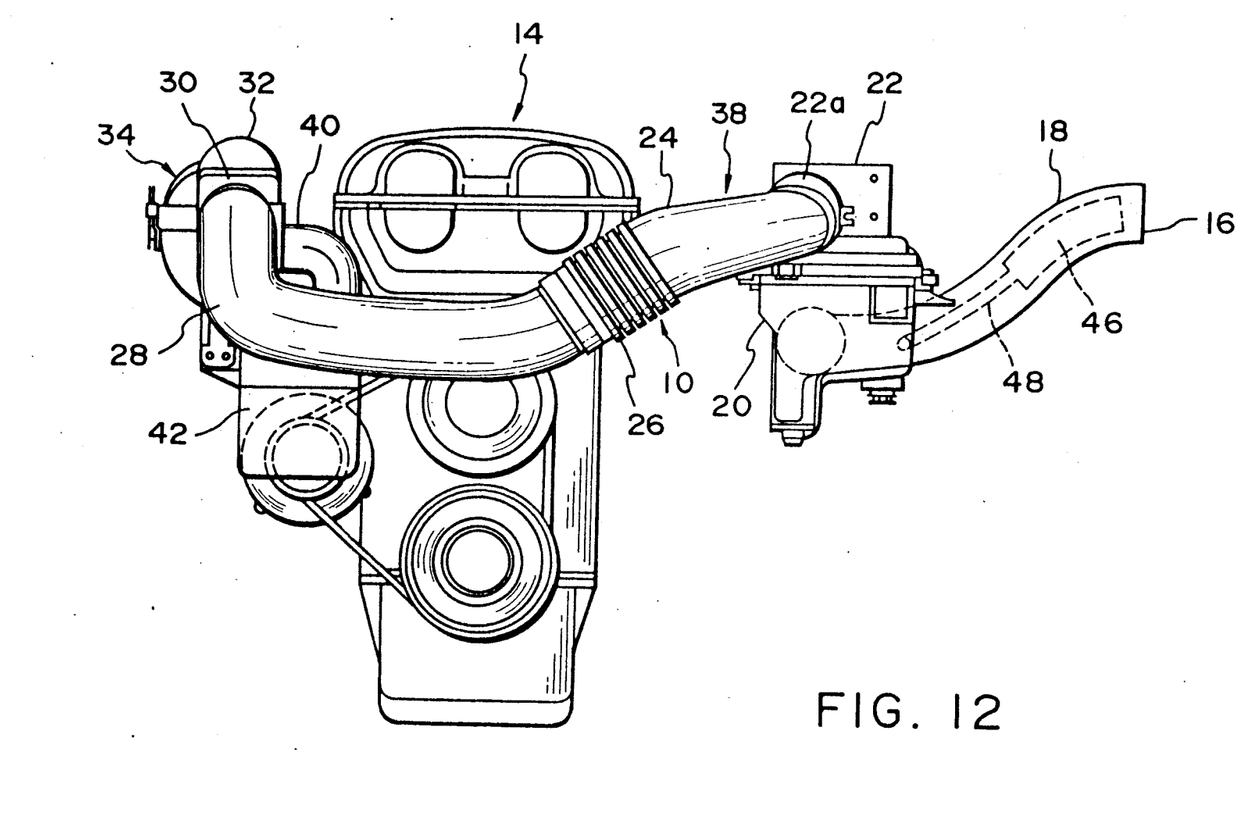
FIG. 12 is a front view showing an arrangement of a four-cylinder engine comprising a suction apparatus according to another embodiment of the present invention.
Figure 13:
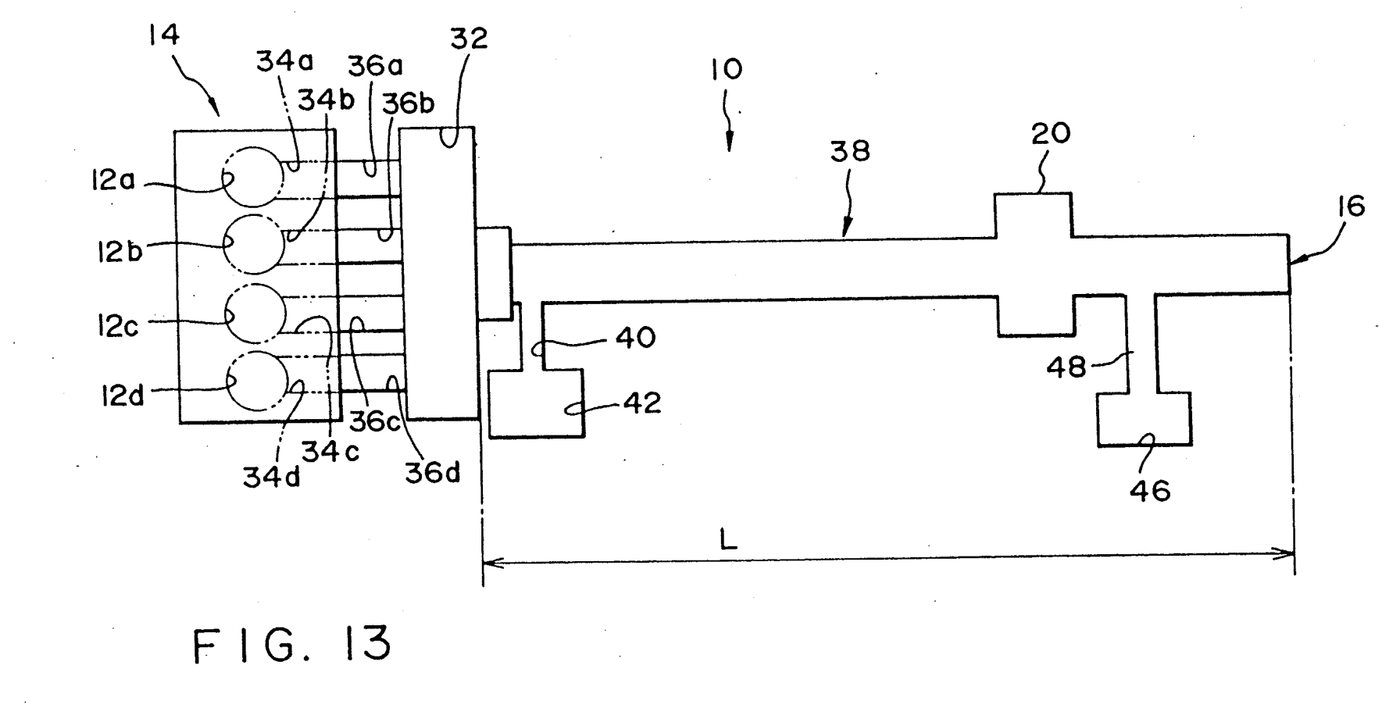
FIG. 13 is a view illustrating a propagation path of a compression wave caused by intake pulsation of the suction apparatus shown in FIG. 12.

In the embodiment described above, in order to eliminate a resonant wave of an order twice that of a resonant wave eliminated by the resonator 42, the side-branch silencer 44 is connected to the fresh air duct 18 at the upstream side of the air cleaner 20 at the position where the loop of the resonant wave of the double order is formed. However, the present invention is not limited to this. As shown in FIGS. 12 and 13 as another embodiment, a Helmholtz resonator 46 may be used as the silencer 44 of the above embodiment.

In this case, the Helmholtz resonator 46 is connected to the fresh air duct 18 through a connecting pipe 48. The connecting point of the connecting pipe 48 is set at a position 29 cm downstream from the opening portion 16 in the same manner as the connecting position of the side-branch silencer 44 of the above embodiment. More specifically, the resonator 46 has a volume of 50 cc, and the connecting pipe 48 has a pipe diameter of 20 mm and a length of 145 mm.

In the above embodiment, the suction apparatus 10 is applied to the engine 14 comprising the surge tank 32. However, the present invention is not limited to this arrangement. For example, the suction apparatus 10 may be applied to an engine having no surge tank 32. In this case, an intake pulsation generation source is defined by a portion where a common intake pipe and branch intake pipes connected to intake ports of cylinders are branch-connected.

In the above embodiment, the engine 14 is a four-cylinder engine. However, the present invention is not limited to this. For example, the present invention may be applied to any other multi-cylinder engines.

As many apparently widely different embodiments of the present invention can be made without departing from the spirit and scope thereof, it is to be understood that the invention is not limited to the specific embodiments thereof except as defined in the appended claims.

What is claimed is:

1. A suction apparatus for an engine, said apparatus comprising:
   an intake path which has an opening portion at one end, and the other end of which is connected to an intake pulsation generation source;
   a plurality of branch intake pipes, one end of each of which is directly connected to said intake pulsation generation source and the other end of each of which is connected to a corresponding cylinder; and
   first means, connected to a downstream portion of said intake path, for eliminating a (0.5+n)th-order resonant wave (where n is an integer not less than 0) in said intake path which is induced by a compression wave generated from said intake pulsation generation source toward the upstream side, wherein said first means includes a resonator which resonates with the (0.5+n)th-order resonant wave in said intake path, and a connecting pipe for connecting said resonator to that portion of said intake path which is in close proximity to the intake pulsation generation source.

2. The suction apparatus according to claim 1, wherein said resonator comprises a Helmholtz type resonator.

3. The suction apparatus according to claim 1, wherein said resonator and said connecting pipe are set to have characteristics for inducing a resonant wave which generates a maximum positive pressure in a communicating portion of said connecting pipe to said intake path at a timing at which the $(0.5+n)$th-order resonant wave generated in said intake path generates a minimum sound pressure in a downstream end portion of said intake path.

4. The suction apparatus according to claim 3, wherein said connecting pipe is connected to said intake path at a position where a loop of a sound pressure of the $(0.5+n)$th-order resonant wave in said intake path closest to said intake pulsation generation source is formed.

5. The suction apparatus according to claim 1, wherein said first means is arranged to eliminate a 0.5th-order resonant wave in said intake path.

6. The suction apparatus according to claim 1, wherein said intake pulsation generation source comprises a surge tank.

7. A suction apparatus for an engine, said apparatus comprising:
an intake path which has an opening portion at one end, and the other end of which is connected to an intake pulsation generation source;
first means, connected to a downstream portion of said intake path, for eliminating a $(0.5+n)$th-order resonant wave (where n is an integer not less than 0) in said intake path which is induced by a compression wave generated from said intake pulsation generation source toward the upstream side; and
second means, connected to said intake path, for eliminating a resonant wave of an order twice that of the resonant wave eliminated by said first means.

8. The suction apparatus according to claim 7, wherein said second means is connected to an upstream portion of said intake path.

9. The suction apparatus according to claim 8, wherein said second means is connected to said intake path at a position where a loop of a sound pressure closest to said opening portion in the resonant wave of an order twice that of the resonant wave eliminated by said first means is formed.

10. The suction apparatus according to claim 7, wherein said second means is arranged to eliminate a 3rd-order resonant wave in said intake path.

11. The suction apparatus according to claim 7, wherein said second means comprises a silencer for eliminating the resonant wave of an order twice that of the resonant wave eliminated by said first means.

12. The suction apparatus according to claim 11, wherein said silencer comprises a side-branch type silencer.

13. The suction apparatus according to claim 7, where said second means includes:
a second resonator for eliminating the resonant wave of an order twice that of the resonant wave eliminated by said first means; and
a second connecting pipe for connecting said second resonator to said intake path.

14. The suction apparatus according to claim 13, wherein said second resonator comprises a Helmholtz type resonator.

15. The suction apparatus according to claim 7, wherein said first means is arranged to eliminate a 1,5th-order resonant wave in said intake path.

16. The suction apparatus according to claim 7, wherein said intake pulsation generation source comprises a surge tank.

17. A suction apparatus for an engine, said apparatus comprising:
an intake path which has an opening portion at one end, and the other end of which is connected to an intake pulsation generation source;
a plurality of branch intake pipes, one end of each of which is directly connected to said intake pulsation generation source and the other end of each of which is connected to a corresponding cylinder; and
first means, connected to a downstream portion of said intake path, for eliminating a $(0.5+n)$th-order resonant wave (where n is an integer not less than 0) in said intake path which is induced by a compression wave generated from said intake pulsation generation source toward the upstream side, wherein said first means is connected to that portion of said intake path which is in close proximity to said intake pulsation generation source.

* * * * *

UNITED STATES PATENT AND TRADEMARK OFFICE
CERTIFICATE OF CORRECTION

PATENT NO. :     5,040,495
DATED      :     August 20, 1991
INVENTOR(S) :    Harada et al.

It is certified that error appears in the above-identified patent and that said Letters Patent is hereby corrected as shown below:

ON TITLE PAGE:  Col. 2, FOREIGN PATENT DOCUMENTS,
                after line 4, insert --54-9316 1/1979 Japan--.

Col. 11,  line 17,  "0.5th" should be --1.5th--.

Col. 12,  line 22,  "1,5th" should be --1.5th--.

Signed and Sealed this

Ninth Day of February, 1993

Attest:

STEPHEN G. KUNIN

*Attesting Officer*    Acting Commissioner of Patents and Trademarks